United States Patent [19]

Kornmann et al.

[11] 4,169,426

[45] Oct. 2, 1979

[54] APPARATUS FOR COATING A FILIFORM ELEMENT

[75] Inventors: Michel Kornmann; Marcel Nussbaum; Jürgen Rexer, all of Geneva, Switzerland

[73] Assignee: Battelle Memorial Institute, Carouge, Switzerland

[21] Appl. No.: 817,091

[22] Filed: Jul. 19, 1977

[30] Foreign Application Priority Data

Jul. 20, 1976 [CH] Switzerland ............... 9265/76

[51] Int. Cl.² ................................ B05C 3/12
[52] U.S. Cl. ................................ 118/67; 118/69; 118/405; 427/120; 427/434 E
[58] Field of Search ............ 118/125, 6, 404, 405, 118/420, DIG. 5, 67, DIG. 18, 68, 69, DIG. 19, 65, 63, 620; 164/419, 423; 427/117, 119, 434 R, 434 E, 434 D, 118, 120, 431–433

[56] References Cited

U.S. PATENT DOCUMENTS

| | | | |
|---|---|---|---|
| 2,647,488 | 8/1953 | Shive | 118/405 X |
| 2,914,423 | 11/1959 | Knapp | 118/125 X |
| 3,170,968 | 2/1965 | Rokunohe et al. | 118/125 X |
| 3,227,577 | 1/1966 | Baessler et al. | 118/405 X |
| 3,470,939 | 10/1969 | Coad | 118/125 X |
| 3,523,815 | 8/1970 | Baxter | 118/405 X |
| 3,565,677 | 2/1971 | Dion et al. | 427/434 E |
| 3,598,085 | 8/1971 | Carreker, Jr. | 118/405 |
| 3,687,105 | 8/1972 | Knapp | 118/405 |
| 4,035,521 | 7/1977 | Westervelt et al. | 427/117 X |

FOREIGN PATENT DOCUMENTS

724760  2/1955  United Kingdom ............ 118/420

Primary Examiner—Morris Kaplan
Attorney, Agent, or Firm—Karl F. Ross

[57] ABSTRACT

A filiform workpiece such as a metal wire is advanced at high speed, after passage through several pretreatment baths, in a vertically upward direction through a closed-ended nozzle of a crucible by way of a lower inlet aperture and an upper outlet aperture of that nozzle which is completely filled with a thermally fusible coating material (e.g. zinc). A guide tube adjustably seated in the inlet aperture has an inner diameter substantially equaling that of the workpiece to be coated whereas the outlet aperture, formed by a collar of a substance which is not wettable by the coating material, has a diameter about two to three times as large. A short residence time of less than $5 \cdot 10^{-2}$ second for any given point of the workpiece in the molten mass holds down the temperature of the workpiece and results in rapid hardening of the coating material upon emergence from the bath.

5 Claims, 3 Drawing Figures

– 4,169,426 –

APPARATUS FOR COATING A FILIFORM ELEMENT

FIELD OF THE INVENTION

The present invention relates to an apparatus for the high-velocity coating of a filiform workpiece with thermally fusible material.

BACKGROUND OF THE INVENTION

Continuous coating by immersion (called "freeze-coating" technique) involves a fast feeding of the workpiece through a vessel spout filled with molten coating material which solidifies on contact with the workpiece.

Several conventional processes and devices are based on this technique. Thus, for example, British Pat. No. 982,051 describes a process for coating very thin silica fibers with aluminum, consisting in advancing the fiber downwardly through a vertical slit provided at the extremity of a vessel spout or nozzle, molten aluminum being continuously supplied to the lateral edges of the slit by the intermediary of the nozzle in such manner as to become deposited on the fiber traversing the melt. Fibers so coated, upon emerging from the bath, may be surrounded by an atmosphere of low oxidizing effect designed to avoid the formation of an oxide pellicle on the resulting coating. However, a major disadvantage of this procedure lies in the fact that the downward movement of the fiber causes an irregular and too abundant outflow of the aluminum from the nozzle and makes it difficult to control the quality and the uniformity of the obtained coating. Such a process, moreover, appears to be almost exclusively limited to the deposition of aluminum layers since the utilization of another material, necessarily more fluid, would cause unavoidable leakage of the molten mass from the nozzle.

Another known process for the continuous coating of a steel strip with aluminum, described in French Pat. No. 1,584,626, resides in upwardly advancing, at a maximum velocity on the order of 10 meters per minute, the previously degreased and/or pickled steel strip through the slit of a heated supply nozzle of refractory material filled with molten aluminum, the speed of the strip being such that the residence time of the strip in the nozzle is between 0.03 and 1 second. However, this relatively long residence time only limits but does not completely avoid the formation of a fragile intermetallic layer at the steel/coating interface and causes also an annealing of the substrate. Such a process remains, furthermore, limited to the coating of strips of small thickness (maximum possible thickness on the order of 0.5 mm). Besides, the absence of a neutral atmosphere at the nozzle outlet creates problems regarding the centering of the coating on the strip.

There exist also a number of other processes and devices for coating strips or wires. However, the coating velocity obtained with all these processes or devices are limited, the maximum speed being in fact on the order of 10 meters/minute.

OBJECT OF THE INVENTION

The object of our present invention is to remedy the above-mentioned inconveniences and to provide an apparatus allowing to obtain considerably higher coating velocities, on the order of 400 meters per minute and higher.

SUMMARY OF THE INVENTION

This object is realized, in accordance with our present invention, by means of a freeze-coating apparatus comprising a vessel provided with a lateral nozzle below the bath level as known per se from the aforementioned British Pat. No. 982,051, yet with the difference that the workpiece to be coated—i.e. a filiform element—moves vertically upwardly through the molten coating material in the nozzle by way of a tubular inlet in a lower wall portion and an annular outlet in an upper wall portion thereof. The inlet, advantageously formed by a tube adjustably seated in an aperture of the lower wall portion, has a diameter substantially equal to that of the filiform element to be coated so as to be traversed by the latter virtually without clearance. The coaxial outlet, on the other hand, has a diameter ranging between substantially two and three times that of the workpiece—and thus also of the inlet—and is formed by a substance which is substantially nonwettable by the coating material. We have found, surprisingly enough, that despite the resulting large clearance between the outlet and the emerging workpiece there is no risk of overflow of coating material notwithstanding the hydrostatic head existing by reason of the higher bath level in the main part of the vessel, thanks to gravity and capillary forces as will be explained hereinafter. These overflow-preventing forces can be further aided by a protective gas admitted under pressure into an enclosure extending upwardly from the upper nozzle wall and forming a chamber beyond the outlet.

According to a more specific feature of our invention, the feed means (e.g. a takeup reel) advancing the workpiece through the nozzle has an operating speed high enough to let any part of that workpiece traverse the distance between inlet and outlet in less than $5 \cdot 10^{-2}$ second.

BRIEF DESCRIPTION OF THE DRAWING

The above and other features of our invention will now be described in detail with reference to the accompanying drawing in which.

SPECIFIC DESCRIPTION

Figure 1:
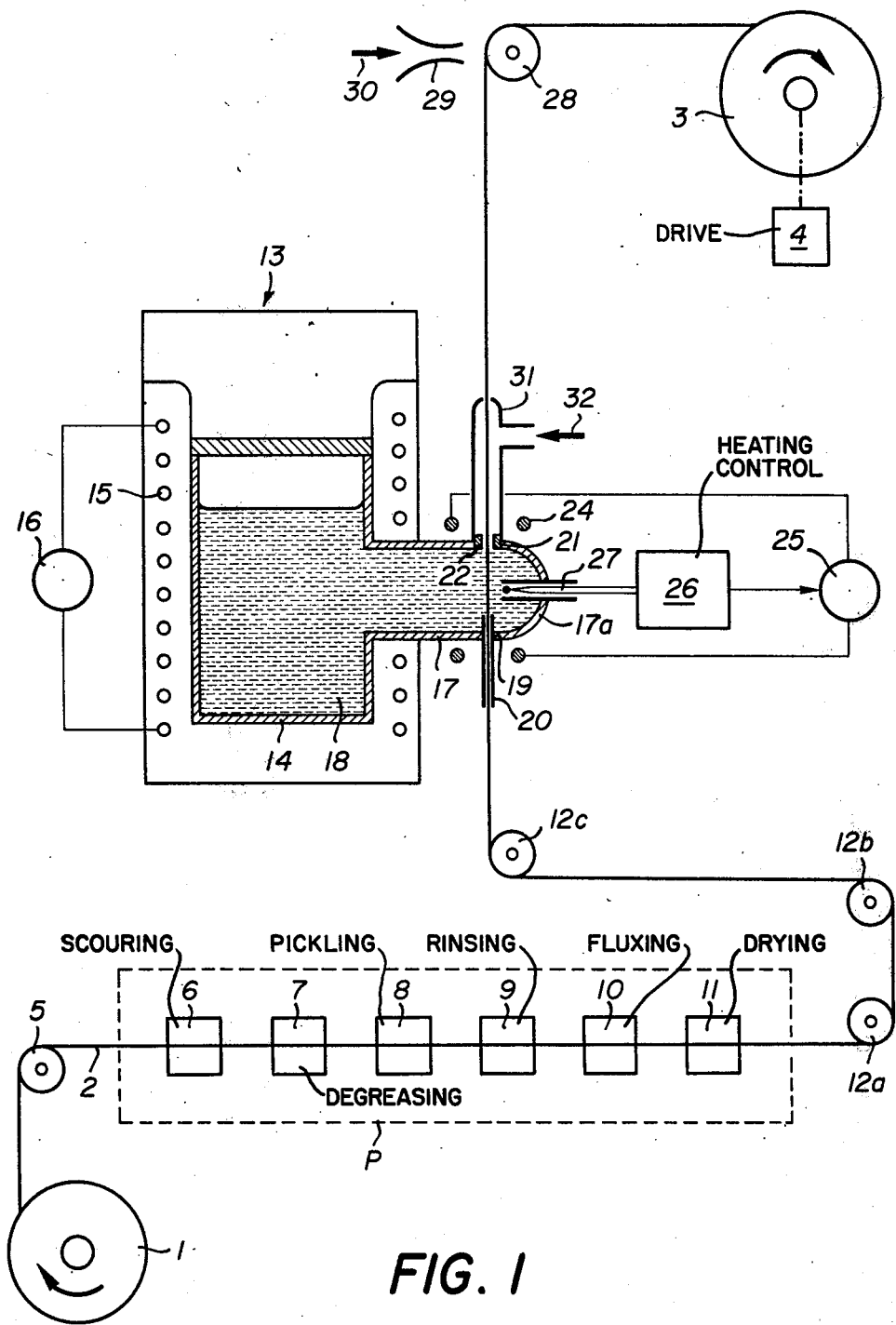
FIG. 1 is a general schematic overall view of an embodiment of our invention.

The installation represented in FIG. 1 comprises a supply reel 1 of wire 2 from which the bare wire 2 to be coated is continuously pulled at a high velocity, through various treatment devices which will be described hereinafter, to a storage reel 3, entrained by drive means 4, on which the coated wire is rewound. The wire 2, extracted from the reel 1, passes over a first deflecting roller 5 through a pretreatment device P designed to insure the cleansing of the wire 2 prior to its coating. Advantageously, this pretreatment device P can comprise a series of degreasing and/or etching baths, here specifically an alkaline scouring bath 6, a trichloroethylene degreasing bath 7 and an acidic pickling bath 8, followed by a rinsing bath 9, a fluxing bath 10 and, finally, a drying tunnel 11. The fluxing bath 10 consists of an aqueous solution of a flux such as, for example, a galvanizing salt mixture of $NH_4Cl$ and $ZnCl_2$, the concentration of the flux being advantageously chosen below 0.5 grams per liter; in most instances we prefer a concentration lower than 0.1 g/l.

The wire 2, thus cleansed and dried, then passes around deflecting rollers 12a, 12b and 12c before emerging below a fusion furnace 13. This fusion furnace comprises a vertical crucible 14 consisting of, for example, cast iron and is equipped with heating elements 15 linked to an electric-energy source 16. A nozzle or spout 17, projecting from the lateral wall of this crucible 14, is a tubular element of circular or rectangular cross-section closed at its free extremity 17a and made of, for example, cast iron or of aluminum oxide or magnesium oxide. The crucible 14 and the nozzle 17 are filled with molten material 18 with which the wire 2 is to be coated. Two coaxial, vertically superposed apertures are drilled in the peripheral wall of nozzle 17, i.e. a lower aperture 19, slidably receiving a vertical tube 20 of a refractory material having an inner cross-section practically equal to the cross-section of the bare wire 2, and an upper aperture 21 in which an annular collar 22 is coaxially mounted. This annular element 22 is made of a material not wettable by the molten material 18 and has, advantageously, an inner diameter which is approximately two to three times as large as the diameter of the wire 2. The nozzle 17 is, moreover, equipped with an additional heating system comprising, for example, a coil 24 connected to a high-frequency source 25 and controlled by a conventional regulating device 26 whose input is connected to a thermocouple 27 directly immersed in the mass 18 inside nozzle 17 in the immediate vicinity of the path of wire 2 and whose output is connected to a control terminal of the high-frequency source 25.

The deflecting roller 12c and the nozzle 17 are so disposed with reference to each other as to allow the wire 2 to pass freely at high velocity through the nozzle 17, vertically upwardly, the wire 2 entering the nozzle 17 by the lower inlet 19 through the sliding tube 20 and emerging by the upper aperture 21 through the annular element 22, before being directed by the intermediary of a deflecting roller 28 (disposed in line with nozzle 17) onto the storage reel 3 where it is rewound. At the outlet of nozzle 17, furthermore, we provide a wire-protecting system consisting of a tubular element 31, vertically mounted around the projecting portion of the ring 22 and continuously supplied with a protective gas (such as argon or nitrogen) at a slight overpressure from a supply symbolically represented in the drawing by an arrow 32. The roller 28 located downstream of nozzle 17 is continuously cooled via a nozzle 29 by a jet of high-pressure gas such as compressed air from a source represented schematically in the drawing by an arrow 30.

The pretreatment of the wire before coating has the purpose of providing a clean wire surface, free of any trace of grease and/or oxides, so as to allow a good wetting of the wire by the molten mass upon its subsequent passage through the nozzle and insuring good adherence. More particularly, the function of the fluxing treatment is to protect the wire from oxidation until its entry into the nozzle as well as to improve afterwards the wetting of the wire by the coating agent.

The subsequent passage at high velocity (on the order of 400 m/min. or more) of the cold wire 2 through the nozzle 17, filled with molten material 18, brings about the solidification of this material 18 on the cold wire 2 so that the latter emerges from the nozzle coated with a layer of predetermined thickness of this material. The exact mechanism of the formation of this layer is, in fact, somewhat more complex and one can assume that the obtained coating is composed of three superposed sublayers formed by different phenomena, namely:

an inner layer formed by the diffusion of the molten material into the substrate (generally too thin for detection by an optical microscope);

an intermediate layer formed by solidification, in the very nozzle, of the molten material 18 on contact with the cold wire; and an external layer, formed by the liquid material 18 entrained by viscosity around the preceding layers, which solidifies after emerging from the nozzle and whose thickness depends on the degree of viscosity of the molten material (this thickness being small with reference to that of the preceding layer in the case of a molten metallic material but relatively large for a molten thermoplastic material).

The inner cross-section of the nozzle must be such as to permit the flow of as much molten material as is required for the process.

The residence time of any point of the wire 2 in the nozzle 17 being very short (on the order of $10^{-4}$ to $5 \cdot 10^{-2}$ second), the solidification of the liquefied material upon contact with the wire can only take place when this contact has been able to take hold during the brief immersion period. It is thus essential that a proper wetting of the wire occur during this short period. It is precisely for this reason that we subject the wire to the pretreatment process inasmuch as proper wetting depends to a great extent on the state of cleanness of the wire. To obtain a good coverage of the wire, it is furthermore necessary that the flux layer covering the wire on its entry into the nozzle be of the smallest thickness possible so that this layer can completely disappear during the short residence time of the wire in the nozzle. This is why we utilize, during the pretreatment, a very low concentration of fluxing agent in the bath (lower than 0.5 g/l), substantially less than that utilized in the known coating procedures using lower workpiece speeds. We have observed, moreover, that this wetting is also favored by the presence of a surface of low roughness so that it is possible to further improve this pretreatment process by adding a mechanical polishing process. It should be noted that the oxide layer present on the surface of the molten mass does not in any way hinder this wetting because of the construction of the nozzle disposed below the melt surface, in contradistinction to conventional low-velocity coating techniques requiring the use of a flux covering the bath.

Figure 2:
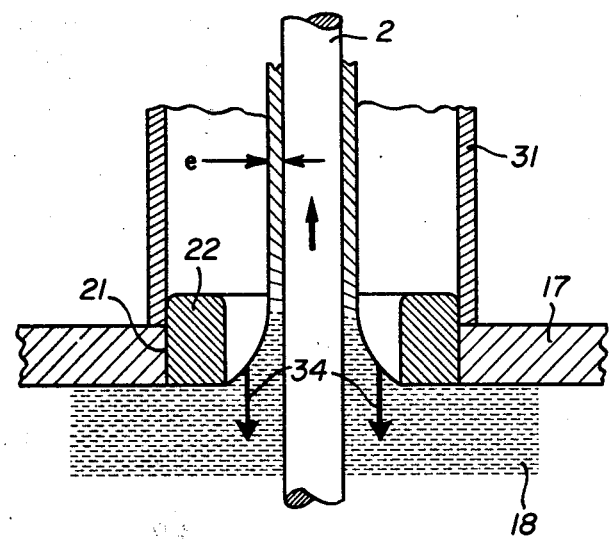
FIG. 2 is a cross-sectional view illustrating a detail of the system of FIG. 1 on a larger scale.

The presence of collar 22 at the outlet of the nozzle 17, consisting of material not wettable by the molten material 18, has the purpose of stabilizing the operation, preventing the molten material 18 from overflowing from the nozzle by the upper hole 21. While the motion of the wire tends to entrain the mass upwardly, the capillary forces and gravity tend to make the meniscus re-enter the nozzle; the shape of the liquid surface at the upper hole 21 is schematically represented in FIG. 2 where the action of the capillary forces and gravity has been symbolized by arrows 34. This molten material would tend to overflow from the nozzle if the collar 22 were wettable by the molten material, inasmuch as the capillary forces would then aid the entraining force of the wire. Furthermore, the hydrostatic head of the liquid in vessel 14 is opposed by the pressure of the gas from source 32.

The inner diameter of this collar (two to three times the diameter of the wire) represents a compromise between the need for a sufficiently large aperture to prevent the touching of the edges of the nozzle outlet by the wire when vibrating, and the need for a sufficiently small aperture to insure a certain stability of the meniscus and to prevent the liquid from overflowing. The nonwettable material of collar 22 permits, furthermore, operation with a slight overpressure in the nozzle to dispense with complex means for adjusting the bath level.

Any danger of leakage of the molten material 18 through the lower aperture 19 of the nozzle is, moreover, eliminated by the fact that the inner cross-section of the tube 20, slidably mounted in this aperture 19, is practically equal to that of the wire. This slidable tube 20 can be raised all the way up to the upper hole 21 for complete isolation of the wire with respect to the molten material 18, which facilitates the handling of the wire at the time of introduction; its selective lowering enables an adjustment of the immersion length of the wire in the molten material and thus a variation of the residence time in the bath. It is also possible to provide for the presence of a neutral gas (or vacuum) at the nozzle inlet so as to avoid all risk of formation of oxides on the wire.

The use of controlled supplemental heating means 24 around the nozzle 17 serves to maintain constant the temperature of the molten material residing in the nozzle. Such an arrangement permits, on the one hand, to prevent any possible risk of a sudden solidification of a large portion of the standing molten material on account of the constant abstraction of heat through the wire, and, on the other hand, to insure the obtention of a layer of reproducible thickness e (FIG. 2) since the thickness of the deposited layer depends on the temperature of the bath. The use of high-frequency heating is advantageous because of its great rapidity of response; such a heating mode is, however, not essential and could very well be replaced by other heating means.

The presence of a chemically neutral atmosphere 32 around the wire at the nozzle outlet has essentially the purpose of preventing significant oxidation of the meniscus which would affect the quality of the product. This protection, in addition, is necessary for certain couples such as aluminum/iron with a view to obtaining a "centered" wire having a coating evenly distributed around its circumference. Such even distribution, or uniformity of coating, is not impeded by any minor eccentricity of the workpiece 2 relative to the outlet, thanks to the annular clearance existing between the collar 22 and the coated wire.

The rapid cooling of the coated wire downstream of nozzle 17 by its passage around the copper roller 28, cooled in turn by the air nozzle 29, has the purpose of reducing to a minimum the annealing period of the wire from the instant of its entry into the nozzle (total annealing time lower than $10^{-1}$ sec so that the properties of the wire, and in particular its tensile strength, remain practically unchanged during the treatment.

After coating, the wire can be submitted to various thermal treatments designed to modify certain properties of the substrate, the coating and/or the interface.

Figure 3:
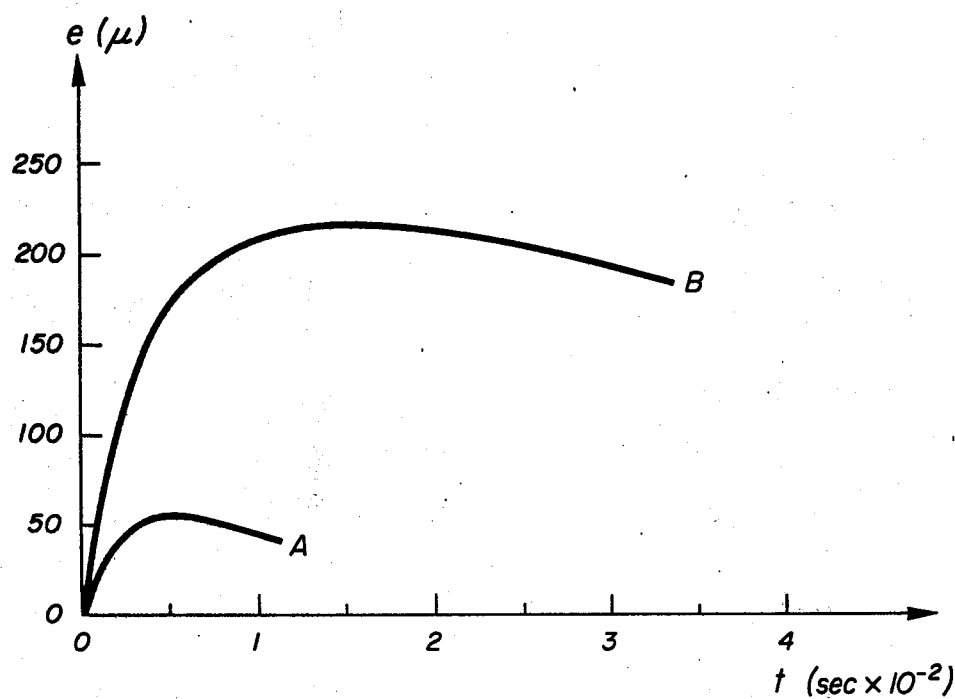
FIG. 3 is a graph relating to the performance of the apparatus according to the invention.

The thickness e of the coating obtained depends on a certain number of parameters: initial diameter of the wire, state of cleanness and roughness of the wire, transport speed, residence time in the bath (function of the transport velocity and of the depth of immersion), bath temperature and initial temperature of the wire. We have found that the thickness of the resulting layer at first increases to a maximum and then decreases in dependence upon the residence time in the bath. Such a behavior is illustrated in FIG. 3 where two curves represent the variations in the thickness e of the layer (expressed in microns) as a function of the residence time t in the bath for a stainless-steel wire passing through an aluminum bath maintained at 693° C., the curve A relating to a wire of 0.2 mm diameter and the curve B relating to a wire of 0.5 mm diameter. Curves A and B are seen to have peaks at approximately 0.005 sec and 0.015 sec, respectively.

Whereas the thickness of the deposit increases under otherwise equal conditions with the initial diameter of the wire, it decreases as the bath temperature increases and also when the wire is introduced heated into the bath. One can thus obtain a coating of predetermined thickness by modifying these various parameters, the range of thickness thus obtainable being wider than with conventional procedures.

In order to obtain relatively thick coating layers it is, furthermore, possible to cause several successive passages of the wire through the same nozzle or to provide an installation comprising a plurality of nozzles successively traversed by the same wire (the diameter of the outlet orifice of the successive nozzles being progressively increased).

In certain cases where the thickness of the outer layer (caused by viscous entrainment as described above) is considered too great for the planned application, especially with a molten thermoplastic material having high viscosity, the nozzle outlet may be provided with a diaphragm having an internal cross-section corresponding to the desired thickness of the coating.

Moreover, we have found that the structure of the obtained layer depends upon the transport speed in the interior of the nozzle, the solidification structure becoming finer and presenting less segregation for higher speeds.

By way of example, the described apparatus can have the following dimensions: crucible 14 having a capacity of 1.5 liters and nozzle 17 of circular cross-section with an internal diameter (thus a maximum immersion height) of 12 mm. Such an apparatus enables coating of wires having diameters on the order of millimeters, with advancing velocities on the order of 400 m/min.

Workpieces suitable to be coated with such an apparatus can be of very varied nature, e.g.

Metal wires of steel, aluminum, copper, titanium, nickel, niobium, molybdenum or alloys of these metals as well as nonmetallic wires or the like.

Likewise, the coatings to be applied to such wires may differ greatly; they can include metallic coatings of aluminum, zinc, tin, copper, nickel, vanadium, niobium, or alloys of these metals, as well as nonmetallic coatings of thermoplastics, glass or the like. One possible application is the deposition of superconductive coatings on wires having a niobium or molybdenum base. In certain instances it may be desirable to add very fine and very hard solid particles, e.g. of aluminum, silicon carbide, diamond or the like, to the bath in order to obtain abrasive-coated wires which are particularly resistant to wear.

Finally, the very short immersion and cooling periods provided in accordance with our invention prove to be advantageous in more than one respect. These brief periods, for example, cause practically no modification of the substrate so as to enable the coating of workpieces such as wires of hardened carbon steel which it is impossible to coat without tempering by conventional immersion methods. With our improved apparatus, these shortened periods also allow realization of coatings which present thermodynamically unstable structures, as well as deposition of alloys over a wide solidification range without fractionated solidification. They also obviate, e.g. in the case of the couples steel-/aluminum or steel/zinc, the formation of all fragile intermetallic compounds of the type $Fe_2Al_5$ or $Fe_2Zn_5$. Finally, they facilitate the use of high-melting metals for coating a wire having a lower melting point as, for example, the deposition of a copper layer on aluminum.

The possible applications are numerous: anodes for cathodic protection (coating of Zn, Al or Mg on steel wire), electrodes for soldering (stainless steel coated with copper), enameled wire for motor windings, filiform reinforcements for pneumatic tires, abrasive wire for sawing, etc.

EXAMPLE 1

Coating of a Carbon-Steel Wire with Zinc

A flexible steel wire (0.7% by weight carbon), drawn hard, having a diameter of 0.5 mm, is continuously passed through the installation of FIG. 1 at a transport speed of 450 m/min.

At first, before its passage through the nozzle, the wire is subjected to the following pretreatment: alkaline scouring followed by rinsing and acid pickling with HCl followed by rinsing, fluxing and drying. The fluxing is carried out in an aqueous bath of a mixture of $NH_4Cl$ and $ZnCl_2$ in the proportions 1:9, the concentration of the mixture being 0.1 g/l.

The wire is then passed through a nozzle 17 made of an iron commercially known under the name ARMCO, filled with molten zinc maintained at 425° C. The nozzle, of circular cross-section, has an inner diameter of 10 mm and the annular collar 22 at its outlet is of aluminum. The wire, upon emerging from the nozzle, is surrounded by a nitrogen atmosphere.

The steel wire so treated carries a zinc coating of a thickness of 30 microns and has a smooth and glossy appearance. The steel/coating interface is free of any intermetallic compounds. A winding test carried out on a mandrel having a diameter equal to three times the wire diameter shows a good adherence of this zinc coating on the steel wire. The tensile strength of the wire before coating is 51 kg, that of the wire after coating is 54 kg. The coated wire has, moreover, a good corrosion resistance under tension.

EXAMPLE 1A

A wire similar to the preceding one, but in a soft state instead of being drawn hard, is subjected to the same operations as in Example 1. After coating, this wire undergoes a thermal treatment of several minutes at 320° C. to further improve the adhesion between the wire and the coating and is then submitted to stretching tests. These tests involve a reduction of the cross-section of the wire to approximately 80% without causing any deterioration with respect to the coating.

EXAMPLE 2

Coating of a Nonoxidizable Steel Wire with Aluminum

A wire of austenitic stainless steel (18% Cr and 8% Ni), having a diameter of 0.1 mm, is advanced at a speed of 450 m/min and subjected to a pretreatment similar to the aforedescribed one. The stainless-steel wire then passes through a cast-iron nozzle 17 filled with molten aluminum (99.99% Al) maintained at 690° C. The nozzle of circular cross-section has an inner diameter of 12 mm, and its collar 22 is of aluminum. Upon exiting from the nozzle, the wire is surrounded by a nitrogen atmosphere.

The thickness of the aluminum layer deposited on the wire is 30 microns. The steel/aluminum interface is free of any intermetallic compounds, and the aluminum layer shows a good adherence. The mechanical properties of the wire remain unchanged.

EXAMPLE 3

Coating of a Wire of Austenitic Stainless Steel with a Zinc Alloy

A wire of austenitic stainless steel wire as described above, having a diameter of 1 mm, is passed at a velocity of 450 m/min through a nozzle identical with the one of Example 1, filled with a zinc alloy (0.1% Al) maintained at 430° C.

The thickness of the zinc layer obtained is 30 microns. There is no intermetallic interface. The adherence of the layer is good.

EXAMPLE 4

Coating of a Carbon-Steel Wire with Aluminum

A steel wire containing 0.7% carbon and having a diameter of 0.5 mm is passed at a speed of 450 m/min through a nozzle identical to the one of Example 2, the temperature of the molten-aluminum bath being maintained at 690° C.

An aluminum coating of 50 microns thickness is obtained on the wire, having a good adherence. The interface is free of any intermetallic compound.

EXAMPLE 5

The same operations are carried out as in Example 2, the only difference residing in the fact that the protective nitrogen atmosphere at the nozzle outlet is eliminated.

The resulting coating is of mediocre quality, unevenly distributed around the wire circumference.

EXAMPLE 6

Coating of a Copper Wire with Nylon

A copper wire having a diameter of 0.6 mm is passed at a velocity of 100 m/min through a nozzle filled with nylon maintained at 300° C.

The emerging copper wire carries a nylon coating of 50 microns, very even, adherent and insulating. Such a wire can be used like enameled wire for motor windings.

We claim:

1. An apparatus for freeze-coating a filiform element with thermally fusible material, comprising:
    a vessel provided with a lateral nozzle and adapted to be filled to a level above said nozzle with said thermally fusible material, said nozzle having a lower wall portion and an upper wall portion respectively provided with a tubular inlet and an annular outlet vertically aligned and coaxial with each other, said inlet having a diameter substantially equal to that of a filiform element to be coated, said outlet having a diameter ranging between substantially two and three times that of said inlet and being formed from a substance which is substantially nonwettable by said thermally fusible material;

said inlet comprising a tube adjustably seated in an aperture of said lower wall portion and long enough to reach said outlet in an elevated position;

an enclosure extending upwardly from said upper wall portion and forming a chamber aligned with said outlet, said chamber being connected to a source of protective gas under pressure;

heating means at said vessel and at said nozzle in the vicinity of said inlet and outlet for maintaining said thermally fusible material therein in a molten state;

feed means for axially advancing said filiform element in an upward direction by way of said inlet, outlet through said thermally fusible material and through said protective gas and enclosure; and cooling means disposed above said enclosure in the path of said filiform element and comprising a deflecting member engageable by said filiform element and a source of cooling fluid trained upon said member.

2. An apparatus as defined in claim 1 wherein said feed means has an operating speed high enough to let any part of said filiform element traverse the distance between said inlet and outlet in less than $5 \cdot 10^{-2}$ second.

3. An apparatus as defined in claim 1 wherein said heating means comprises a high-frequency coil.

4. An apparatus as defined in claim 1 wherein said deflecting member comprises a roller.

5. An apparatus as defined in claim 1, further comprising pretreatment means upstream of said inlet for cleansing said filiform element.

* * * * *